Nov. 24, 1959

A. WALLER 2,914,290

WEIGHING APPLIANCE

Filed Dec. 26, 1956

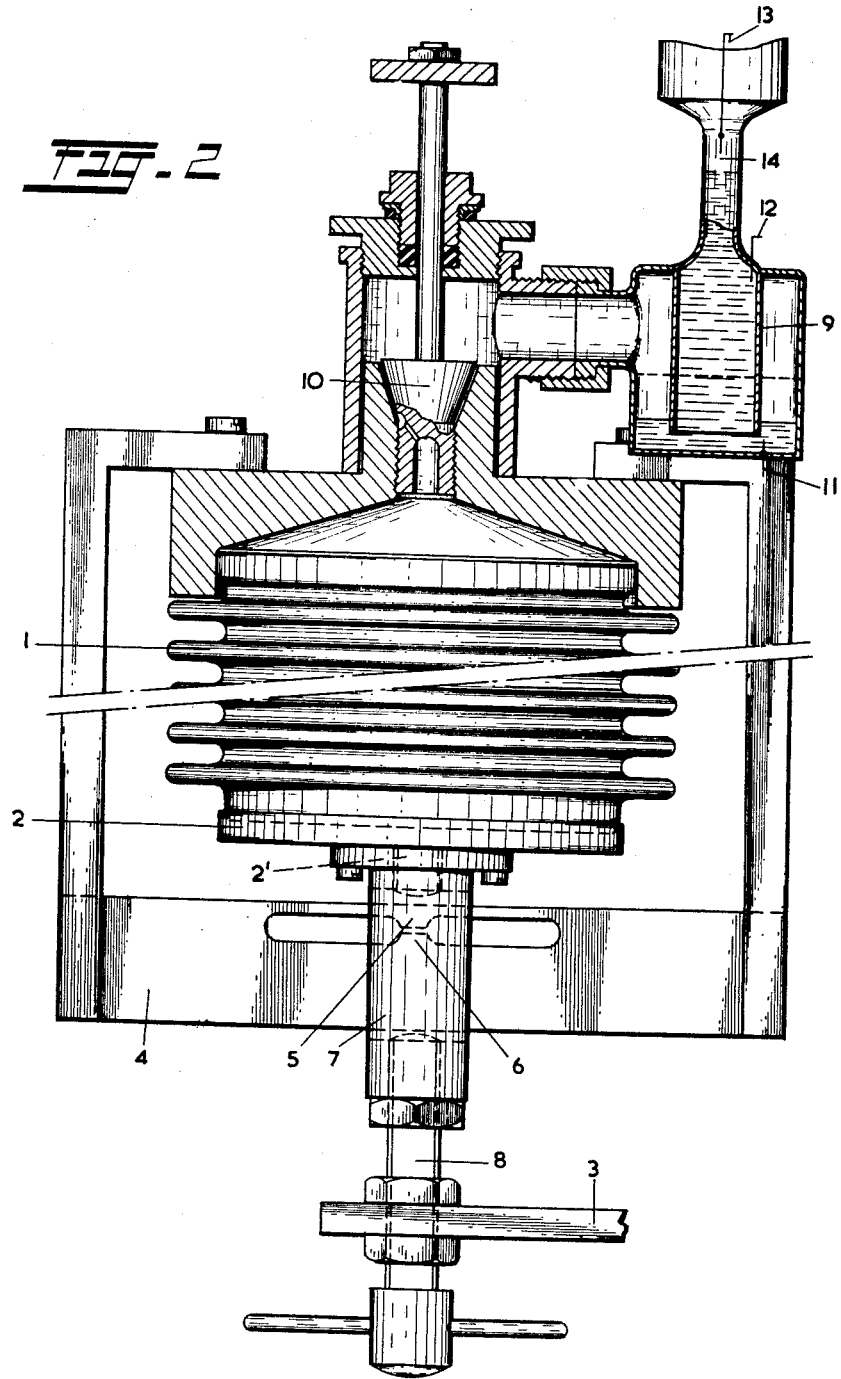

United States Patent Office 2,914,290
Patented Nov. 24, 1959

2,914,290
WEIGHING APPLIANCE

Arnoud Waller, Vlaardingen, Netherlands, assignor to Albatros Superfosfaatfabrieken N.V., Utrecht, Netherlands, a Dutch limited-liability company of the Netherlands Application December 26, 1956, Serial No. 630,534

Claims priority, application Netherlands January 2, 1956

6 Claims. (Cl. 249—2)

The invention relates to a weighing appliance for automatically weighing out given quantities of bulk goods, e.g. for bagging them, said appliance being equipped with a weighing beam which carries on one side a weight and on the other side a collecting device (a bin or bag) for the bulk goods, and which on the attainment of the position of equilibrium operates an electric contact for the sudden cut-off of the supply of bulk goods. In such a weighing appliance the supply of the bulk goods as a rule first takes place in a big stream until about 90 percent of the quantity to be weighed out has been reached, and subsequently in a small stream until the position of equilibrium has been attained.

Owing to different causes weighing errors tend to occur in weighing appliances of this type, and one of the chief causes is found to consist in that the weighing beam requires a given adjusting time to adopt the position corresponding to the quantity supplied. When therefore, the desired quantity of bulk goods has been supplied, it takes a few moments before the weighing beam attains its position of equilibrium and shuts off the supply by the operation of the contact. During those moments a surplus of bulk goods is thus supplied.

This error can be kept small by making the stream of bulk goods very small towards the end of the weighing operation, but in this way the duration of the weighing cycle is unduly prolonged. For this reason this error is usually corrected by the provision of a compensatory auxiliary weight. The surplus of bulk goods supplied during the adjusting time of the weighing beam is, however, dependent on the intensity of the stream of bulk goods, which intensity again depends on the nature of the bulk goods, so that the auxiliary weight has to be adjusted whenever the nature of the bulk goods changes.

The invention has for its object to provide a weighing appliance in which, without prolongation of the duration of the weighing operation, the above mentioned error is almost entirely eliminated, so that an adjustable auxiliary weight for compensation, at least of this error, can be dispensed with.

To attain this object, the weighing beam is caused to act, at least during the latter part of its stroke, on a device which upon a small movement of the weighing beam produces a rapidly increasing counterpressure, e.g. a manometer, while a contact device is used which responds to a very slight movement of the weighing beam. Owing to the reaction which the weighing beam experiences from the counterpressure device an additional directive force arises, which shortens the adjusting time of the weighing beam to such an extent that the above mentioned weighing error becomes negligible.

Further features of the weighing appliance according to the invention will appear from the following description and are referred to in the sub-claims.

The invention will be elucidated more in detail with reference to the drawings, which illustrate an embodiment of the weighing appliance according to the invention.

In the drawings:

Figure 2 is a side view, partly in section, of a counterpressure and contact device which cooperates with the weight-carrying arm of the weighing beam.

Figure 1:
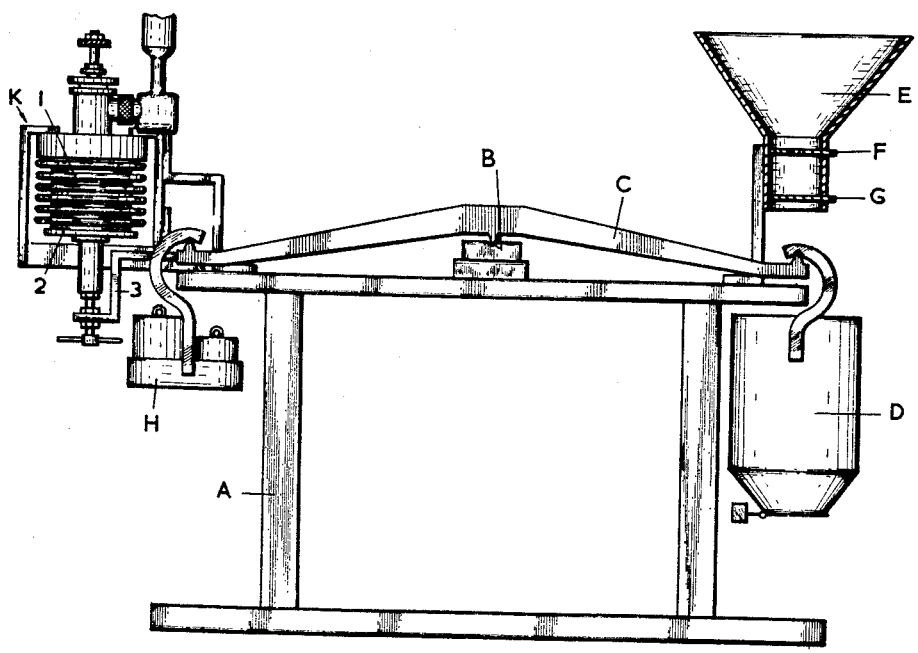
Figure 1 is a schematic side view of the weighing appliance.

In Figure 1 of the drawings a frame A is provided with pivots B for a weighing beam C. From the right hand arm of said weighing beam C is suspended a bin D adapted to receive a stream of bulk goods from a hopper E. Two electrically controlled valves F and G are provided, the upper valve F controlled by contacts 11 and 12 (Fig. 2) serving to cut off the main stream of bulk goods when about 90% of the required quantity has reached the bin D and to leave only a small stream of goods flowing, which small stream will be cut off by the lower valve G controlled by contacts 11 and 13 (Figure 2) when the equilibrium position of the weighing beam is reached. From the left arm of the weighing beam C is suspended the main weight H. For the purposes of this invention the left arm of said weighing beam is provided with an extension 3 coupled to a counterpressure and contact device K which is shown in greater detail in Fig. 2.

In Fig. 2 the numeral 1 denotes a stationary bellows supported by frame A. To the movable bottom 2 of this bellows is attached a bracket 7, to which is connected the arm of the weighing beam 3 which carries the weight. Connected to the bellows 1 is a likewise stationary spring plate 4, which comprises a recess in the form of an hour glass. The part 5 of the spring plate above this recess acts as a powerful spring, which co-operates with a pin 2' at the bottom 2 of the bellows 1, and which is thus adapted to support the weighing beam 3 through a length of stroke equal to the width of the constriction of the hour glass, viz. about 0.75 mm. Further bending of the resilient part 5 is not possible, since it will then abut against the part 6 of the spring plate 4. In order to prevent excessive compression of the bellows 1, the bracket 7 encloses the spring plate 4 with some play and is fitted with an adjusting screw 8 co-operating with the bottom of the spring plate 4, by means of which screw the maximum upward movement of the bottom 2 can be adjusted.

The bellows 1 is filled with oil, and at the top is connected with a manometer tube 9 partially filled with mercury. In the conduit between the bellows 1 and the manometer tube 9 a plug 10 is present, which can be screwed up or down a little, in order to provide, between its conical top and the conical part of the bore into which it has been screwed, an adjustable throttle for the oil. In this way the movements of the bottom 2 of the bellows, and consequently also the movement of the weighing beam 3, are damped to an adjustable extent.

In the mercury tube have been fitted three contacts 11, 12 and 13, which are connected to the circuits for controlling the supply of the goods. The uppermost contact 13 is vertically adjustable; the part 14 of the mercury tube between the contacts 12 and 13 is narrowed.

The appliance operates as follows. When the collecting device (consisting of a bin or bag suspended on the weighing beam) is empty, the part 3 of the arm of the weighing beam carrying the weight rests via the bracket 7, the bottom 2 of the bellows, and the pin 2' with the full force of said weight on the spring plate 4, i.e. on the part 5 of the latter, which bends under this force and abuts against the part 6. The bottom 2 of the bellows 1 is thus in its lowest position, while the mercury in the tube 9 is below the level of the contact 12, approximately at the level of the dotted line. When about 30 kg. of the desired quantity (e.g. 50 kg.) has been poured into the collecting device, the resilient part 5 of the spring plate 4 is disengaged from the part 6, and this resilient part forces the weighing beam 3 further upwards as the supply of the goods proceeds. The bottom 2 of the bellows joins in this upward movement, but since the stroke of the resilient part 5 is only small and the cross-section of the lower part of the mercury tube is large, the mercury in this tube will rise comparatively little and will not cause any high pressure in the bellows 1. When about 44 kg. of goods has been poured into the collecting device, the pin 2' comes free from the resilient part 5. The mercury in the tube 9 has then reached the contact 12 and thereby closed a circuit via the contacts 11 and 12, which has the result that from this moment the bulk goods are supplied to the collecting device only in a small stream. Under the influence of this supply of goods the weighing beam will rise slightly more, while owing to the rise of the mercury in the narrowed part 14 of the tube 9 an increasing directive force is exercised on the weighing beam by the bottom 2 of the bellows 1. As soon as the mercury in the tube 9 reaches the contact 13, a circuit is closed between the contacts 11 and 13, as a result of which also the small stream of goods is stopped. Since in the example described the distance between the contacts 12 and 13 is about 5 cm., and the bottom 2 of the bellows 1 has an area of about 100 cm.², the directive force which is exercised on the weighing beam as a result of this rise of the mercury will be about 6 kg., while only a very slight movement of the weighing beam occurs. In this way not only is a very small adjusting time obtained and the weighing error mentioned above practically entirely avoided, but it also becomes possible completely to avoid vulnerable pivots, sensitive to impurities, such as knives and pans.

Since during its very slight movement the weighing beam swings through only an extremely small angle, it can be secured to the bellows. In fact, the movable bottom 2 of the bellows will easily follow so small a rocking movement.

In order to keep the pressures in the bellows as low as possible and thus enable the use of a flexible bellows construction, it is advantageous for the bellows not to experience any appreciable counterpressure until after it has traversed a given length of stroke. In the example described this is attained by the relatively large cross-section of the tube 9 below the contact 12. In fact, owing to this the bottom 2 of the bellows can join in the upward movement of the resilient part 5 without the mercury rising appreciably and causing a great pressure in the bellows already at this stage. The pressure in the bellows therefore remains comparatively low until the mercury reaches the contact 12, and it is only after this that this pressure begins to increase considerably. This is also important with a view to expansion of the oil with a rise of temperature. In the position of rest of the bellows, owing to this expansion the mercury level in the wide part of the tube 9 will rise only slightly. In the working position, i.e. when the mercury has reached the contact 13, owing to this expansion the bottom 2 of the bellows will have risen slightly less than in other cases. In order to ensure that this does not affect the result of the weighing, the centre of gravity of the weighing beam can be made to coincide with its pivot, so that the weighing beam has no directive force of its own. In that case it does not matter if the weighing beam has swung a little more or a little less upon the closure of the contact 13.

The damping member 10 is preferably adjusted in such a manner that the damping has the critical value when the mercury reaches the contact 13. An accurate control of the quantity to be weighed out is possible in a simple way by vertically adjusting the contact 13. If desired, the contact 12, too, may be vertically adjustable, in order that thus the point can be controlled at which the big stream of bulk goods is replaced by the small stream.

It will be evident that by means of the device described, which can be fitted fairly easily in existing weighing appliances of the type referred to above, the movements of the weighing beam are minimized, and that towards the end of the weighing operation a directive force arises which increases so rapidly that the above mentioned adjusting time of the weighing beam is negligible. By this means therefore one of the chief causes of weighing errors in such weighing appliances is eliminated without an adjustable auxiliary weight being required or the duration of the weighing operation being prolonged for this purpose.

What I claim is:

1. In combination with an automatic weighing device for weighing bulk goods having a frame, a weighing beam pivotally connected to said frame, a standard weight adjacent one end of said weighing beam, a collecting device for the bulk goods on the other end of said weighing beam, and means including a first electrically-controlled valve for depositing the bulk goods into the collecting device at a first rapid rate to partially fill the same and a second electrically-controlled valve for depositing the bulk goods at a slower rate until the desired weight of said bulk goods has been deposited in said collecting device; means for actuating said electrically-controlled valves comprising a vertical manometer tube having a lower portion of comparatively large cross section and an upper portion of relatively smaller cross section, a first electrical contact adjacent the bottom of said manometer tube lower portion, a second electrical contact adjacent the junction of the manometer tube upper and lower portions, and a third electrical contact in the manometer tube upper portion, electrical means connecting said first and second contacts to said first valve to operate the same, electrical means connecting said first and third contacts to said second valve to operate the same, a quantity of mercury in the lower portion of said manometer above and in electrical contact with said first contact, and pressure means actuated by said weighing beam for forcing said mercury progressively upwardly in said manometer tube into electrical contact successively with said second and third contacts as said weighing beam is pivotally displaced during the filling of said collecting device.

2. Weighing apparatus as defined in claim 1 wherein said pressure means for forcing said mercury progressively upwardly in the manometer tube compirses a vertical liquid-filled bellows element, means connecting one end of said bellows element to said weighing beam for movement therewith, the other end of said bellows element being rigidly connected to said frame, and conduit means providing communication between said bellows element and said manometer tube whereby pivotal movement of said weighing beam in a direction to cause compression of said bellows element causes the fluid in said bellows element to force the mercury upwardly in said manometer tube.

3. Weighing apparatus as defined in claim 2 wherein said bellows element does not experience any appreciable counterpressure until the end thereof connected to the weighing beam has traversed a given length of stroke.

4. Weighing apparatus as defined in claim 2 wherein said conduit means providing communication between said bellows element and said manometer tube includes adjustable throttling means.

5. Weighing apparatus as defined in claim 2 and further including spring means having a small operating stroke for restricting pivotal movement of said weighing beam in the direction causing expansion of said bellows element, said spring means being associated with the end of said bellows element connected to said weighing beam, and fixed stop means limiting the extent of expansion of said bellows element.

6. Apparatus as defined in claim 5 wherein the center of gravity of said weighing beam coincides with its pivot axis and wherein the spring is operative only during compression of said bellows element to an extent to cause the mercury level to rise in the manometer tube into contact with said second electrical contact so that further compression of said bellows element causing the mercury level to contact said third electrical contact will be independent of said spring means and the weight of said weighing beam.

References Cited in the file of this patent

UNITED STATES PATENTS

| | | |
|---|---|---|
| 955,323 | Cutler | Apr. 19, 1910 |
| 1,029,598 | Davies | June 18, 1912 |
| 1,729,192 | Smith | Sept. 24, 1929 |
| 1,839,300 | DeGiers | Jan. 5, 1932 |